US012659986B2

(12) United States Patent
Lin

(10) Patent No.: US 12,659,986 B2
(45) Date of Patent: Jun. 16, 2026

(54) METHOD AND APPARATUS FOR TRANSFORM PRECODING CONFIGURATION IN RANDOM ACCESS PROCEDURE

(71) Applicant: Telefonaktiebolaget LM Ericsson (publ), Stockholm (SE)

(72) Inventor: Zhipeng Lin, Nanjing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 684 days.

(21) Appl. No.: 17/904,011

(22) PCT Filed: Jan. 15, 2021

(86) PCT No.: PCT/CN2021/072116
§ 371 (c)(1),
(2) Date: Aug. 10, 2022

(87) PCT Pub. No.: WO2021/159916
PCT Pub. Date: Aug. 19, 2021

(65) Prior Publication Data
US 2023/0101513 A1 Mar. 30, 2023

(30) Foreign Application Priority Data
Feb. 10, 2020 (WO) ................ PCT/CN2020/074617

(51) Int. Cl.
*H04W 74/02* (2009.01)
*H04W 74/00* (2009.01)
(Continued)

(52) U.S. Cl.
CPC ......... *H04W 74/02* (2013.01); *H04W 74/002* (2013.01); *H04W 74/0833* (2013.01); *H04W 74/0836* (2024.01); *H04W 74/0838* (2024.01)

(58) Field of Classification Search
CPC .............. H04W 74/02; H04W 74/002; H04W 74/0836; H04W 74/0838; H04W 74/0833; H04W 74/006
(Continued)

(56) References Cited

U.S. PATENT DOCUMENTS

2020/0351801 A1* 11/2020 Jeon ...................... H04W 52/48
2021/0274558 A1* 9/2021 Takata .............. H04W 74/0833
2022/0014337 A1* 1/2022 Ouchi ............... H04W 74/0808

FOREIGN PATENT DOCUMENTS

EP 3716723 A1 9/2020

OTHER PUBLICATIONS

ZTE Corporation, "Revised work item proposal: 2 step RACH for NR", RP-192330, Sep. 16-20, 2019. (From Applicant's IDS) (Year: 2019).*

(Continued)

*Primary Examiner* — Mang Hang Yeung
(74) *Attorney, Agent, or Firm* — Nicholson De Vos Webster & Elliott LLP

(57) ABSTRACT

A method and apparatus for transform precoding parameter in random access procedure. The method implemented at a terminal device comprises obtaining at least one transform precoding parameter to be used for a request message for a contention free random access (CFRA). The method further comprises transmitting, to a network node, the request message for the CFRA. The request message comprises a random access channel (RACH) preamble and a physical uplink shared channel (PUSCH). A transform precoding on the PUSCH of the request message is controlled based on the at least one transform precoding parameter.

12 Claims, 15 Drawing Sheets

(51) Int. Cl.
*H04W 74/0833* (2024.01)
*H04W 74/0836* (2024.01)
*H04W 74/0838* (2024.01)

(58) Field of Classification Search
USPC ........................................................ 370/329
See application file for complete search history.

(56) References Cited

OTHER PUBLICATIONS

International Search Report and Written Opinion for Application No. PCT/CN2021/072116, Apr. 15, 2021, 16 pages.

Ericsson et al., "Clarification and aligning of terminologies on MSG3 (re)transmission and RAR UL grant in 38.214," May 13-17, 2019, 4 pages, 3GPP TSG-RAN WG1 Meeting #97, R1-1907960, Reno, Nevada, USA.

Huawei et al., "Discussion on channel structure of 2-step RACH," Oct. 14-20, 2019, 14 pages, 3GPP TSG RAN WG1 Meeting #98bis, R1-1910031, Chongqing, China.

Ericsson, "Channel Structure for Two-Step RACH," Oct. 14-18, 2019, 15 pages, 3GPP TSG-RAN WG1 Meeting #98bis, R1-1910906, Chongqing, China.

ZTE Corporation et al., "2-step RACH vs RACH-less handover," Apr. 8-12, 2019, 6 pages, 3GPP TSG RAN WG2 Meeting #105bis, R2-1904247, Xi'an, China.

ZTE Corporation et al., "New work item: 2-step RACH for NR," Dec. 10-13, 2018, 5 pages, 3GPP TSG RAN Meeting #82, RP-182894, Sorrento, Italy.

ZTE Corporation, "Revised work item proposal: 2-step RACH for NR," Sep. 16-20, 2019, 4 pages, 3GPP TSG RAN Meeting #85, RP-192330, Newport Beach, USA.

3GPP TS 36.211 V16.0.0, "3rd Generation Partnership Project; Technical Specification Group Radio Access Network; Evolved Universal Terrestrial Radio Access (E-UTRA); Physical channels and modulation (Release 16)," Dec. 2019, 245 pages, 3GPP Organizational Partners.

3GPP TS 36.331 V15.8.0, "3rd Generation Partnership Project; Technical Specification Group Radio Access Network; Evolved Universal Terrestrial Radio Access (E-UTRA); Radio Resource Control (RRC); Protocol specification (Release 15)," Dec. 2019, 964 pages, 3GPP Organizational Partners.

3GPP TS 38.211 V16.0.0, "3rd Generation Partnership Project; Technical Specification Group Radio Access Network; NR; Physical channels and modulation (Release 16)," Dec. 2019, 129 pages, 3GPP Organizational Partners.

3GPP TS 38.213 V16.0.0, "3rd Generation Partnership Project; Technical Specification Group Radio Access Network; NR; Physical layer procedures for control (Release 16)," Dec. 2019, 146 pages, 3GPP Organizational Partners.

3GPP TS 38.214 V16.0.0, "3rd Generation Partnership Project; Technical Specification Group Radio Access Network; NR; Physical layer procedures for data (Release 16)," Dec. 2019, 147 pages, 3GPP Organizational Partners.

* cited by examiner

Figure 3:
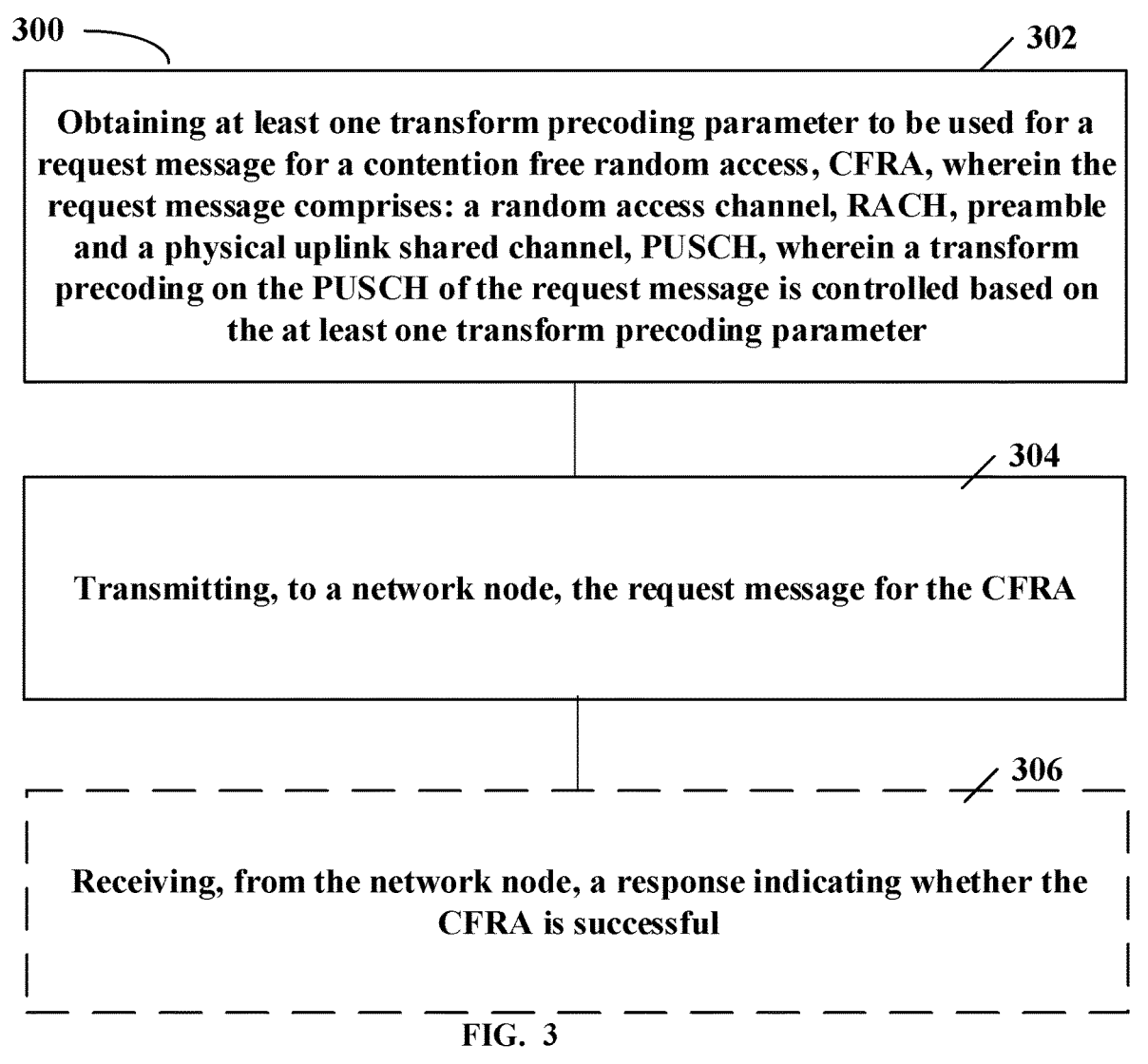

300 ⟍                                 302

Obtaining at least one transform precoding parameter to be used for a request message for a contention free random access, CFRA, wherein the request message comprises: a random access channel, RACH, preamble and a physical uplink shared channel, PUSCH, wherein a transform precoding on the PUSCH of the request message is controlled based on the at least one transform precoding parameter

304

Transmitting, to a network node, the request message for the CFRA

306

Receiving, from the network node, a response indicating whether the CFRA is successful

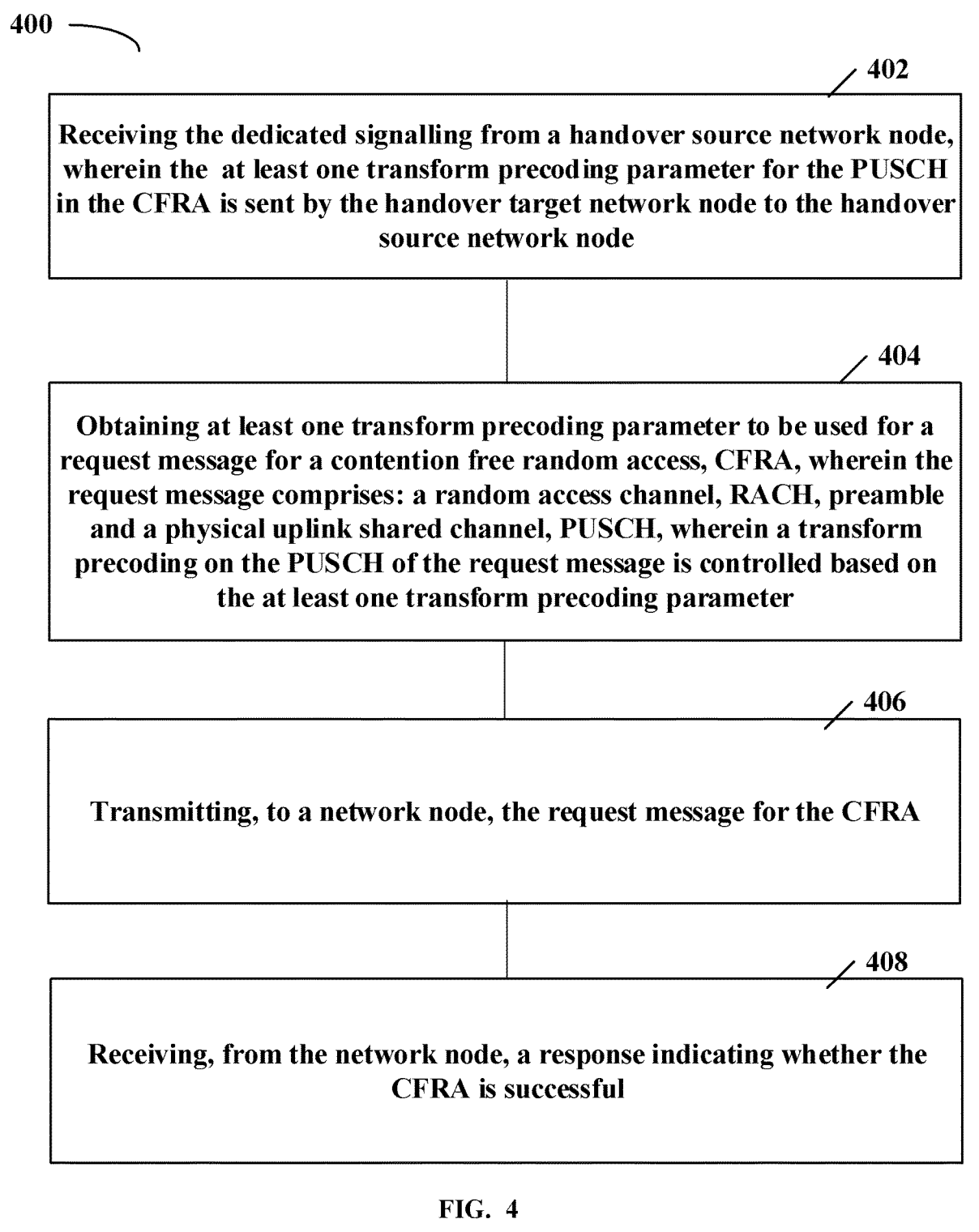

Receiving the dedicated signalling from a handover source network node, wherein the at least one transform precoding parameter for the PUSCH in the CFRA is sent by the handover target network node to the handover source network node

404

Obtaining at least one transform precoding parameter to be used for a request message for a contention free random access, CFRA, wherein the request message comprises: a random access channel, RACH, preamble and a physical uplink shared channel, PUSCH, wherein a transform precoding on the PUSCH of the request message is controlled based on the at least one transform precoding parameter

406

Transmitting, to a network node, the request message for the CFRA

408

Receiving, from the network node, a response indicating whether the CFRA is successful

FIG. 4

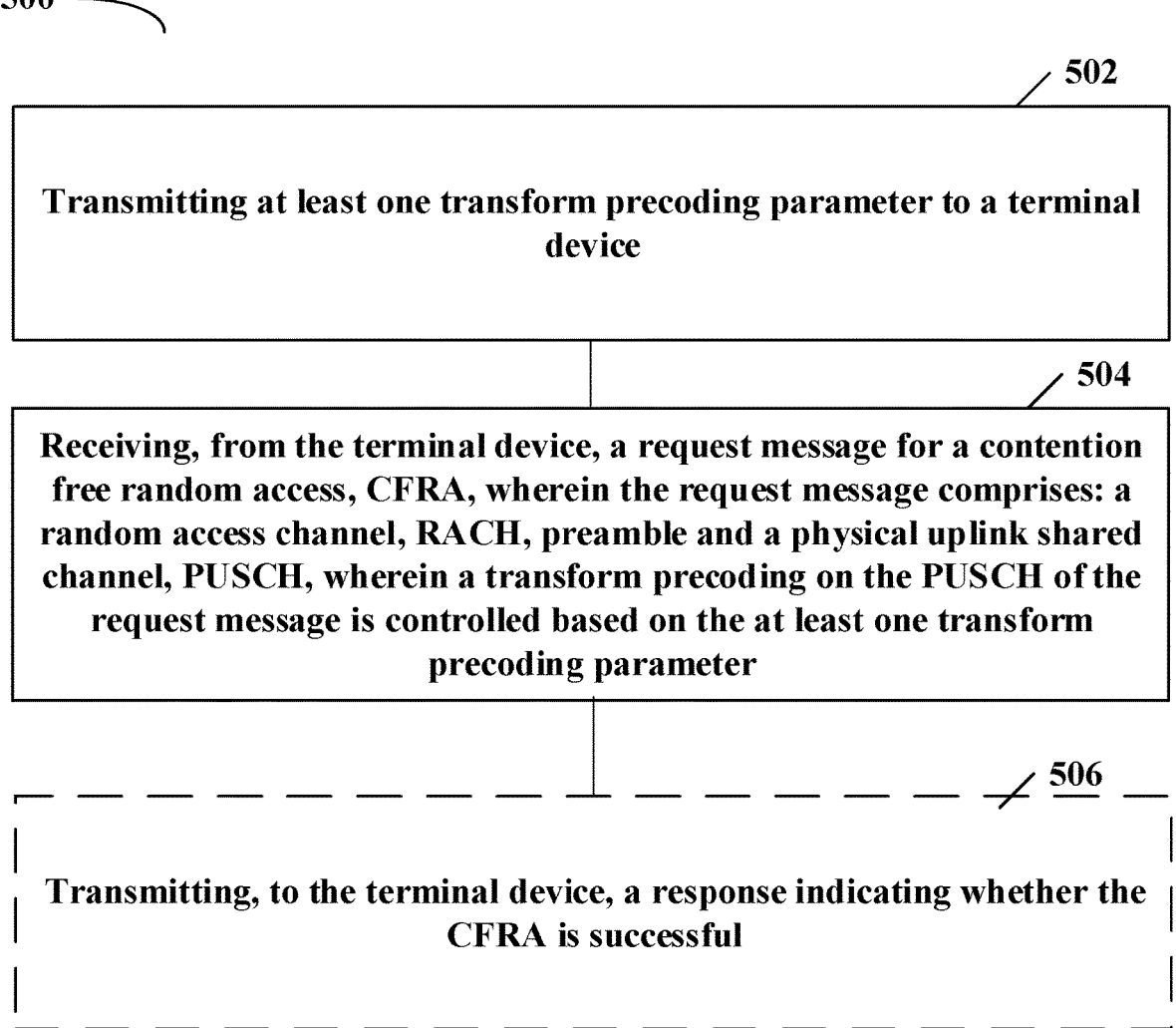

500

502

Transmitting at least one transform precoding parameter to a terminal device

504

Receiving, from the terminal device, a request message for a contention free random access, CFRA, wherein the request message comprises: a random access channel, RACH, preamble and a physical uplink shared channel, PUSCH, wherein a transform precoding on the PUSCH of the request message is controlled based on the at least one transform precoding parameter

506

Transmitting, to the terminal device, a response indicating whether the CFRA is successful

FIG. 5

METHOD AND APPARATUS FOR TRANSFORM PRECODING CONFIGURATION IN RANDOM ACCESS PROCEDURE

CROSS-REFERENCE TO RELATED APPLICATIONS

This application is a National stage of International Application No. PCT/CN2021/072116, filed Jan. 15, 2021, which claims priority to International Application No. PCT/CN2020/074617, filed Feb. 10, 2020, which are hereby incorporated by reference.

TECHNICAL FIELD

The present disclosure relates generally to the technology of wireless communication, and in particular, to methods and apparatuses for transform precoding configuration in random access procedure.

BACKGROUND

This section introduces aspects that may facilitate better understanding of the present disclosure. Accordingly, the statements of this section are to be read in this light and are not to be understood as admissions about what is in the prior art or what is not in the prior art.

FIG. 1 is a diagram illustrating a four-step random access procedure, which is also called Type-1 random access procedure. In a wireless communication system, such as a new radio (NR) system, a four-step/4-step approach as shown in FIG. 1 may be used for random access procedure. In this approach, the terminal device, such as a user equipment (UE) detects a synchronization signal (SS), including primary synchronization signal (PSS), secondary synchronization signal (SSS) in physical broadcast channel (PBCH) and decodes the system information, including remaining minimum system information (RMSI), other system information (OSI), broadcasted in radio resource control (RRC) messages, followed by transmitting a physical random access channel (PRACH) preamble (message 1) in the uplink. A base station, such as a next generation node B (gNB) replies with a random access response (RAR, message 2). The UE then transmits a UE identification (message 3) on physical uplink shared channel (PUSCH).

The UE transmits PUSCH (message 3) after receiving a timing advance command in the RAR, allowing PUSCH to be received with a timing accuracy within the cyclic prefix (CP). Without this timing advance, a very large CP would be needed in order to be able to demodulate and detect PUSCH, unless the system is applied in a cell with very small distance between UE and gNB. Since NR will also support larger cells with a need for providing a timing advance to the UE, the four-step approach is needed for random access procedure.

In the four-step random access channel (RACH) procedure, UE shall, for the PUSCH transmission, consider transform precoding either enabled or disabled, see section 6.1.3 of 3rd generation partnership project (3GPP) technical specification (TS) 38.214 V16.0.0, the disclosure of which is incorporated by reference herein in its entirety.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein.

A first aspect of the present disclosure provides a method implemented at a terminal device. The method comprises obtaining at least one transform precoding parameter to be used for a request message for a contention free random access, CFRA. The method further comprises transmitting, to a network node, the request message for the CFRA. The request message comprises: a random access channel, RACH, preamble and a physical uplink shared channel, PUSCH. A transform precoding on the PUSCH of the request message is controlled based on the at least one transform precoding parameter.

In embodiments of the present disclosure, the at least one transform precoding parameter may comprise one or more of at least one transform precoding parameter for the PUSCH in the CFRA; at least one transform precoding parameter for the PUSCH in a two-step contention-based random access, CBRA; at least one transform precoding parameter for the PUSCH in a four-step random access; at least one transform precoding parameter for the PUSCH scheduled by downlink control information, DCI; and at least one transform precoding parameter for the PUSCH with a configured grant.

In embodiments of the present disclosure, when the at least one transform precoding parameter for the PUSCH in the CFRA is obtained, the transform precoding on the PUSCH of the request message may be controlled based on the at least one transform precoding parameter for the PUSCH in the CFRA.

In embodiments of the present disclosure, when the at least one transform precoding parameter for the PUSCH in the CFRA is not obtained and when at least one of following transform precoding parameters is obtained, the transform precoding on the PUSCH of the request message may be controlled based on the at least one of the following transform precoding parameters:

at least one transform precoding parameter for the PUSCH in the two-step CBRA;

at least one transform precoding parameter for the PUSCH in the four-step random access;

at least one transform precoding parameter for the PUSCH scheduled by downlink control information, DCI; and;

at least one transform precoding parameter for the PUSCH with the configured grant.

In embodiments of the present disclosure, the at least one transform precoding parameter for the PUSCH in the CFRA may be provided in a dedicated signalling.

In embodiments of the present disclosure, a field of the at least one transform precoding parameter for the PUSCH in the CFRA may be provided in the dedicated signalling.

In embodiments of the present disclosure, the dedicated signalling may comprise at least one of a dedicated signalling for random access in a radio resource control, RRC, message; a handover command message; a beam failure recover message; and a physical downlink control channel, PDCCH, ordering the random access with two-step CFRA.

In embodiments of the present disclosure, the dedicated signalling for random access in the RRC may be RACHConfigDedicated information element, IE.

In embodiments of the present disclosure, the network node is a handover target network node, the method may further comprise receiving the dedicated signalling from a handover source network node. The at least one transform precoding parameter for the PUSCH in the CFRA may be sent by the handover target network node to the handover source network node.

In embodiments of the present disclosure, the CFRA is a two-step CFRA, the method may further comprise receiving, from the network node, a response indicating whether the CFRA is successful.

In embodiments of the present disclosure, the transform precoding on the PUSCH of the request message may be controlled based on the at least one transform precoding parameter for the PUSCH in the CFRA.

In embodiments of the present disclosure, the transform precoding on the PUSCH of the request message may be controlled based on the at least one transform precoding parameter for the PUSCH in a two-step contention-based CBRA.

In embodiments of the present disclosure, the transform precoding on the PUSCH of the request message may be controlled based on the at least one transform precoding parameter for the PUSCH in a four-step random access.

In embodiments of the present disclosure, the transform precoding on the PUSCH of the request message may be controlled based on the at least one transform precoding parameter for the PUSCH scheduled by DCI.

In embodiments of the present disclosure, the transform precoding on the PUSCH of the request message may be controlled based on the at least one transform precoding parameter for the PUSCH with a configured grant.

A second aspect of the present disclosure provides a method implemented at a network node. The method comprises transmitting at least one transform precoding parameter to a terminal device. The method further comprises receiving, from the terminal device, a request message for a contention free random access, CFRA. The request message comprises a random access channel, RACH, preamble and a physical uplink shared channel, PUSCH. A transform precoding on the PUSCH of the request message is controlled based on the at least one transform precoding parameter.

In embodiments of the present disclosure, the network node is a handover target network node, said transmitting at least one transform precoding parameter to the terminal device may comprise transmitting the at least one transform precoding parameter for the PUSCH in the CFRA to a handover source network node which transmits the at least one transform precoding parameter for the PUSCH in the CFRA in the dedicated signalling to the terminal device.

In embodiments of the present disclosure, the CFRA is a two-step CFRA, the method may further comprise transmitting, to the terminal device, a response indicating whether the CFRA is successful.

A third aspect of the present disclosure provides a terminal device, comprising: a processor; and a memory. The memory contains instructions executable by the processor, whereby the terminal device is operative to obtain at least one transform precoding parameter to be used for a request message for a contention free random access, CFRA. The terminal device is further operative to transmit, to a network node, the request message for the CFRA. The request message comprises a random access channel, RACH, preamble and a physical uplink shared channel, PUSCH. A transform precoding on the PUSCH of the request message is controlled based on the at least one transform precoding parameter.

A fourth aspect of the present disclosure provides a network node, comprising: a processor; and a memory. The memory contains instructions executable by the processor, whereby the network node is operative to transmit at least one transform precoding parameter to a terminal device; and receive, from the terminal device, a request message for a contention free random access, CFRA. The request message comprises a random access channel, RACH, preamble and a physical uplink shared channel, PUSCH. A transform precoding on the PUSCH of the request message is controlled based on the at least one transform precoding parameter.

A fifth aspect of the present disclosure provides a terminal device. The terminal device comprises an obtaining module and a transmitting module. The obtaining module may be configured to obtain at least one transform precoding parameter to be used for a request message for a contention free random access, CFRA. The transmitting module may be configured to transmit, to a network node, the request message for the CFRA. The request message comprises a random access channel, RACH, preamble and a physical uplink shared channel, PUSCH. A transform precoding on the PUSCH of the request message is controlled based on the at least one transform precoding parameter.

A sixth aspect of the present disclosure provides a network node. The network node comprises a transmitting module and a receiving module. The transmitting module may be configured to transmit at least one transform precoding parameter to a terminal device. The receiving module may be configured to receive, from the terminal device, a request message for a contention free random access, CFRA. The request message comprises: a random access channel, RACH, preamble and a physical uplink shared channel, PUSCH. A transform precoding on the PUSCH of the request message is controlled based on the at least one transform precoding parameter.

A seventh aspect of the present disclosure provides a computer program product comprising instructions which, when executed on at least one processor, cause the at least one processor to carry out any of the methods according to the first and second aspects of the disclosure.

An eighth aspect of the present disclosure provides a communication system including a host computer including: processing circuitry configured to provide user data; and a communication interface configured to forward the user data to a cellular network for transmission to a terminal device. The cellular network includes a network node above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

A ninth aspect of the present disclosure provides a communication system including a host computer including: a communication interface configured to receive user data originating from a transmission from a terminal device; a network node. The transmission is from the terminal device to the network node. The network node is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

A tenth aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node which may perform any step of the method according to the second aspect of the present disclosure.

An eleventh aspect of the present disclosure provides a communication system including a host computer. The host computer may comprise processing circuitry configured to provide user data, and a communication interface configured to forward the user data to a cellular network for transmission to a UE. The cellular network may comprise a network node having a radio interface and processing circuitry. The network node's processing circuitry may be configured to perform any step of the method according to the second aspect of the present disclosure.

A twelfth aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node. The UE may perform any step of the method according to the first aspect of the present disclosure.

A thirteenth aspect of the present disclosure provides a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

A fourteenth aspect of the present disclosure provides a method implemented in a communication system which may include a host computer, a network node and a UE. The method may comprise, at the host computer, receiving user data transmitted to the network node from the UE which may perform any step of the method according to the first aspect of the present disclosure.

A fifteenth aspect of the present disclosure provides a communication system including a host computer. The host computer may comprise a communication interface configured to receive user data originating from a transmission from a UE to a network node. The UE may comprise a radio interface and processing circuitry. The UE's processing circuitry may be configured to perform any step of the method according to the first aspect of the present disclosure.

A sixteenth aspect of the present disclosure provides a method implemented in a communication system which may include a host computer, a network node and a UE. The method may comprise, at the host computer, receiving, from the network node, user data originating from a transmission which the network node has received from the UE. The network node may perform any step of the method according to the second aspect of the present disclosure.

A seventeenth aspect of the present disclosure provides a communication system which may include a host computer. The host computer may comprise a communication interface configured to receive user data originating from a transmission from a UE to a network node. The network node may comprise a radio interface and processing circuitry. The network node's processing circuitry may be configured to perform any step of the method according to the second aspect of the present disclosure.

An eighteenth aspect of the present disclosure provides a computer-readable storage medium storing instructions which, when executed on at least one processor, cause the at least one processor to carry out any of the methods according to the first and second aspects of the disclosure.

Embodiments herein afford many advantages, of which a non-exhaustive list of examples follows. In some embodiments herein, methods for transform precoding configuration on PUSCH in CFRA (such as msgA PUSCH waveform configuration in CFRA) is proposed. In some embodiments herein, the proposed methods can consider the flexible signaling dynamically provided in the dedicated message and/or the signaling overhead via reusing some of the existing parameters instead. The embodiments herein are not limited to the features and advantages mentioned above. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

DETAILED DESCRIPTION

Figure 1:
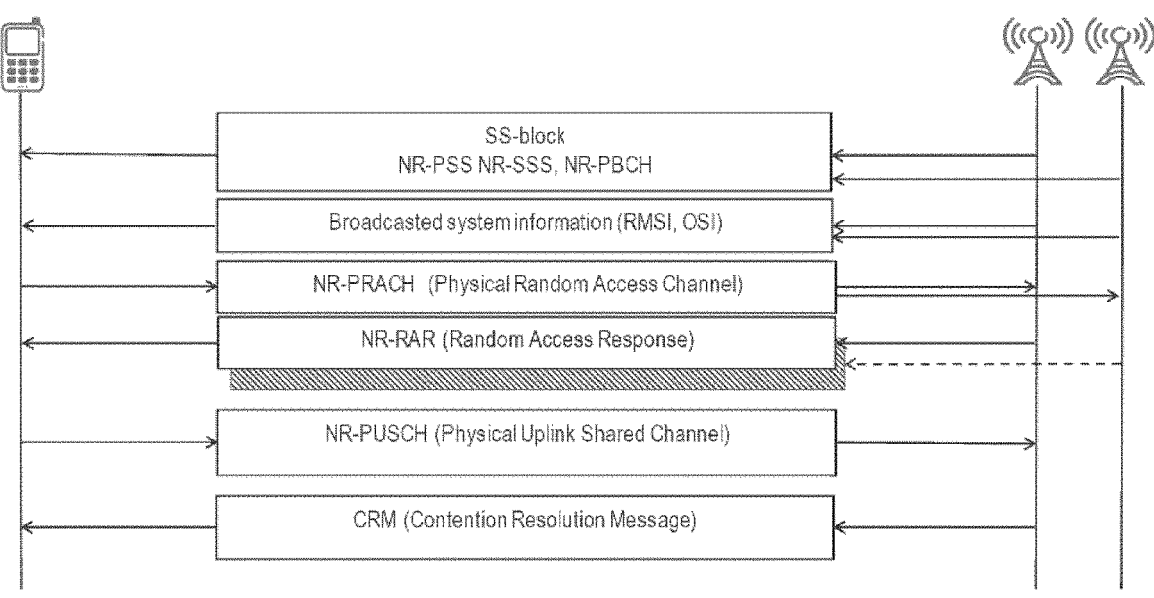
FIG. 1 is a diagram illustrating a four-step random access procedure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" or "communication network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

Further, term "network node" or "network side node" may also refer to a network device with core network function. The network node may refer to a mobility management entity (MME), or a mobile switching center (MSC).

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2A:
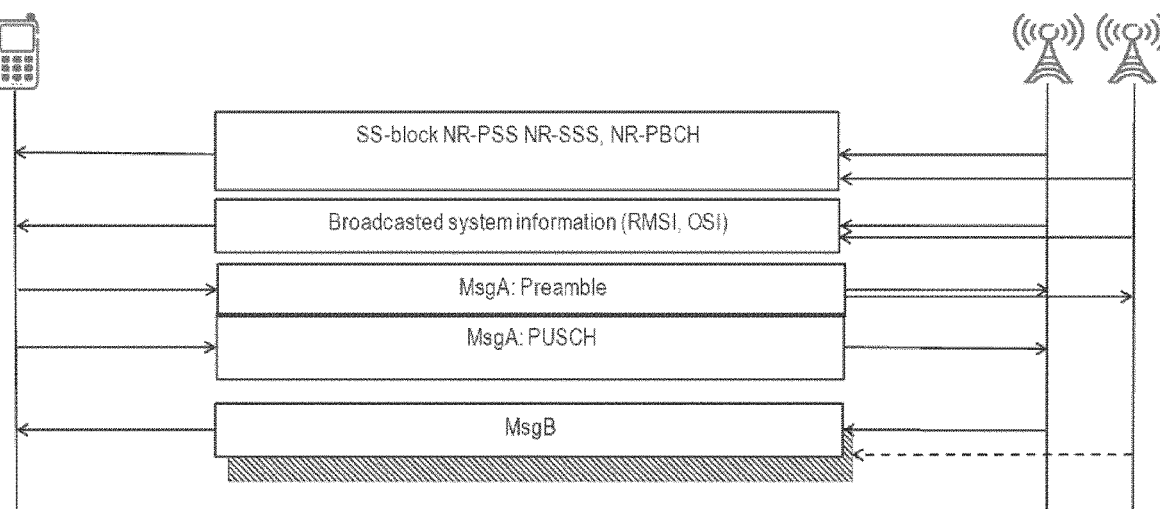
FIG. 2a is a diagram illustrating a two-step random access procedure.

FIG. 2 is a diagram illustrating a two-step random access procedure, which is also called Type-2 random access procedure. As illustrated in FIG. 2, the initial random access may be completed in only two-steps. Similar to the four-step random access procedure, the terminal device, such as a user equipment (UE) detects a synchronization signal (SS), including primary synchronization signal (PSS), secondary synchronization signal (SSS) in physical broadcast channel (PBCH) and decodes the system information, including remaining minimum system information (RMSI), other system information (OSI), broadcasted in radio resource control (RRC) messages. At the first step, the UE transmits, to the base station, the request message (message A, MsgA) for the random access. As the second step, the UE receives, from the base station, a response (message B, MsgB) indicating whether the random access is successful. The request message (MsgA) may comprise a RACH preamble and a PUSCH.

Particularly, message A (msgA) may include random access preamble together with higher layer data such as radio resource control (RRC) connection request possibly with some small payload on PUSCH. Message B(MsgB) may include UE identifier assignment, timing advance information, and contention resolution message, etc.

In such two-step RACH procedure, the preamble and PUSCH will be transmitted by UE in one message called message A before UE receives the random access response (message B).

In NR RAN #85 meeting, it is agreed to support CFRA two-step RACH as indicated in RP-192330, Revised work item proposal: two-step RACH for NR, Newport Beach, USA, Sep. 16-20, 2019, the disclosure of which is incorporated by reference herein in its entirety.

For transmission of msgA PUSCH, i.e. the PUSCH part of msgA, the notion of a PUSCH Resource Unit has been introduced, where a PUSCH Resource Unit consists of time-frequency radio resources of transmission and DMRS (Demodulation Reference Signal) sequence configuration. Two simultaneous msgA PUSCH transmissions can be distinguished by the receiver since different PUSCH Resource Units have been used for the two simultaneous transmissions. The notion of PUSCH Occasion is also introduced, where a PUSCH occasion consists of time-frequency radio resources for the transmission of a msgA PUSCH.

In four-step random access and two-step random access, the random access can be performed in two different ways: contention-based random access (CBRA) and contention-free random access (CFRA). The difference is which pre-amble is used. In the contention-based case, the UE ran-domly selects a preamble from a range of preambles. Here there might be collisions if two UEs select the same pre-amble. In the contention-free case, the UE is given a specific preamble by the network and since it is given by the network, this will ensure that two UEs will not select the same preamble, thus it is collision-free. The CBRA may be used when the UE is in an idle/inactive state and wants to go to the connected state, while the CFRA may be used for performing handover and/or in beam failure procedures.

Figure 2B:
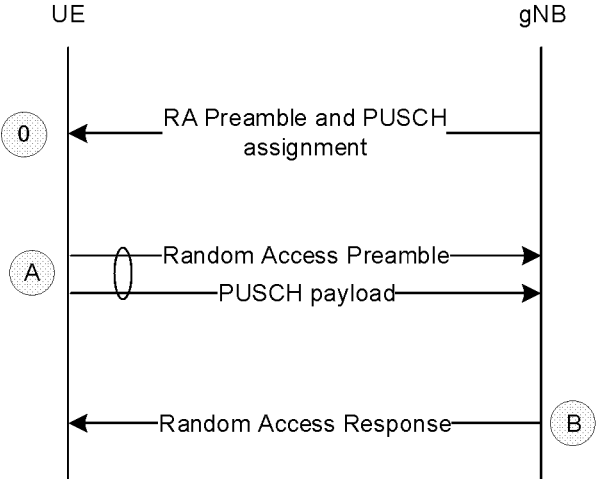
FIG. 2b is a diagram illustrating CFRA with two-step RA type.
Figure 2C:
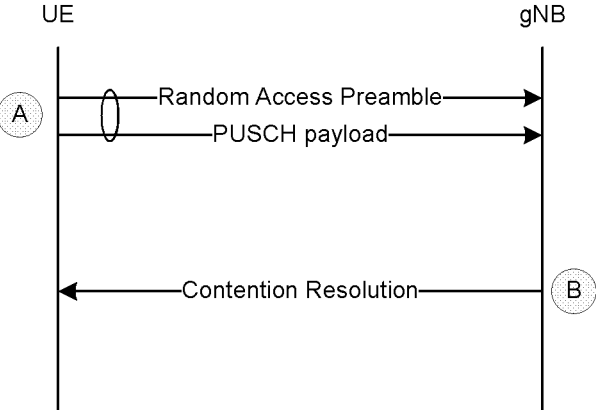
FIG. 2c is a diagram illustrating CBRA with two-step RA type.

FIG. 2b is a diagram illustrating CFRA with two-step RA type. FIG. 2c is a diagram illustrating CBRA with two-step RA type.

The MsgA of the two-step RA type includes a preamble on PRACH and a payload on PUSCH. After MsgA trans-mission, the UE monitors for a response from the network within a configured window. For CFRA, upon receiving the network response, the UE ends the random access procedure as shown in FIG. 2b. For CBRA, if contention resolution is successful upon receiving the network response, the UE ends the random access procedure as shown in FIG. 2c; while if fallback indication is received in MsgB, the UE performs Msg3 transmission and monitors contention reso-lution. If contention resolution is not successful after Msg3 (re)transmission(s), the UE goes back to MsgA transmission.

UE procedure for applying transform precoding on PUSCH (as described in section 6.1.3 of 3GPP TS 38.213 V16.0.0)

For a PUSCH scheduled by RAR UL grant, or for a PUSCH scheduled by fallbackRAR UL grant, or for a PUSCH scheduled by DCI (Downlink control information) format 0_0 with CRC (Cyclic redundancy check) scrambled by TC-RNTI (Temporary Cell RNTI (Radio Network Tem-porary Identifier)), the UE shall consider the transform precoding either 'enabled' or 'disabled' according to the higher layer configured parameter msg3-transformPrecoder.

For a MsgA PUSCH in CBRA, the UE shall consider the transform precoding either 'enabled' or 'disabled' according to the higher layer configured parameter msgA-transform-Precoder (for CBRA). If higher layer parameter msgA-transformPrecoder is not configured, the UE shall consider the transform precoding either 'enabled' or 'disabled' according to the higher layer configured parameter msg3-transformPrecoder.

For PUSCH transmission scheduled by a PDCCH with CRC scrambled by CS-RNTI (Configured Scheduling RNTI) with NDI (New Data Indicator)=1, C-RNTI (Cell RNTI), or MCS-C-RNTI (Modulcation Coding Scheme Cell RNTI) or SP-CSI-RNTI (Semi-Persistent CSI RNTI):

If the DCI with the scheduling grant was received with DCI format 0_0, the UE shall, for this PUSCH trans-mission, consider the transform precoding either enabled or disabled according to the higher layer con-figured parameter msg3-transformPrecoder.

If the DCI with the scheduling grant was not received with DCI format 0_0

If the UE is configured with the higher layer parameter transformPrecoder in pusch-Config, the UE shall, for this PUSCH transmission, consider the transform precoding either enabled or disabled according to this parameter.

If the UE is not configured with the higher layer parameter transformPrecoder in pusch-Config, the UE shall, for this PUSCH transmission, consider the transform precoding either enabled or disabled according to the higher layer configured parameter msg3-transformPrecoder.

For PUSCH transmission with a configured grant

If the UE is configured with the higher layer parameter transformPrecoder in configuredGrantConfig, the UE shall, for this PUSCH transmission, consider the trans-form precoding either enabled or disabled according to this parameter.

If the UE is not configured with the higher layer parameter transformPrecoder in configuredGrantConfig, the UE shall, for this PUSCH transmission, consider the trans-form precoding either enabled or disabled according to the higher layer configured parameter msg3-transform-Precoder.

In two-step RA procedure, the preamble and msgA PUSCH may be transmitted by a UE in one message called message A (msgA). The msgA PUSCH resource allocation for CFRA may be as below in general. The PUSCH resource for two-step CFRA associated with the dedicated preamble may be configured to the UE via a dedicated signalling (i.e. it may not be included in SIB1 (System Information Block Type 1)). For example, the msgA PUSCH can be a kind of dynamically scheduled PUSCH in CFRA (such as two-step CFRA). However there is not any solution for how to determine or configure transform precoding on PUSCH (such as msgA PUSCH) in CFRA.

To overcome or mitigate the above mentioned problem or other problems, some embodiments of the present disclosure propose a solution for how to determine or configure trans-form precoding on PUSCH in CFRA. The proposed solution according to some embodiments considers the flexible sig-naling dynamically provided in the dedicated message and/or the signaling overhead via reusing some of the existing parameters instead.

FIG. 3 shows a flowchart of a method according to an embodiment of the present disclosure, which may be per-formed by an apparatus implemented in/as a terminal device or communicatively coupled to the terminal device. As such, the apparatus may provide means for accomplishing various parts of the method 300 as well as means for accomplishing other processes in conjunction with other components.

At block 302, the terminal device may obtain at least one transform precoding parameter to be used for a request message for a CFRA. A transform precoding on the PUSCH of the request message may be controlled based on the at least one transform precoding parameter. The request mes-sage may comprise a RACH preamble and a PUSCH. The RACH preamble may be configured to the terminal device via a dedicated signalling. The dedicated signalling may be any suitable dedicated signalling such as RACH-Con-figDedicated information element (IE) in a radio resource control (RRC) message as described in 3GPP TS36.331 V15.8.0, the disclosure of which is incorporated by refer-ence herein in its entirety. The CFRA may be any suitable random access. In an embodiment, the CFRA may be two-step CFRA. The request message may be MsgA of two-step CFRA. The PUSCH may be PUSCH of MsgA.

The transform precoding may be a processing step of PUSCH to generate complex-valued symbols. In an embodi-ment, the functionality of transform precoding may be similar to the corresponding transform precoding as described in various 3GPP specifications such as 3GPP TS38.213 V16.0.0, 3GPP TS 36.211 V16.0.0, etc. When the terminal device obtains the at least one transform precoding parameter, the terminal device may consider the transform precoding either 'enabled' or 'disabled' according to the at least one transform precoding parameter.

Waveform of PUSCH can be CP-OFDM (Cyclic-Prefix Orthogonal Frequency Division Multiplexing) or DFT-S-OFDM (Discrete Fourier Transformation Spread Orthogonal Frequency Division Multiplexing). If transform precoding is enabled, DFT-S-OFDM is used, if transform precoding is not enabled, CP-OFDM is applied. For example, the transformer precoder configuration, also called as waveform configuration, may be used to apply a DFT transformation to generate signals or channels with DFT-S-OFDM waveform. If the transformer precoder is disabled, a cyclic prefix-orthogonal frequency division multiplexing (CP-OFDM) waveform is generated. The details of transform precoding may be obtained from section 6.3.1.4 of 3GPP TS 38.211 V16.0.0

The at least one transform precoding parameter may be any suitable transform precoding parameters configured for various PUSCHs. In an example, the at least one transform precoding parameter may comprise at least one of the transform precoding parameters (such as msg3-transform-Precoder, msgA-transformPrecoder (for CBRA), transform-Precoder, etc.) as described in section 6.1.3 of 3GPP TS 38.213 V16.0.0. The at least one transform precoding parameter may be configured to the terminal device in various ways. For example, a transform precoding parameter may be preconfigured in the terminal device. A transform precoding parameter may be transmitted to the terminal device in a dedicated signalling. A transform precoding parameter may be transmitted to the terminal device in a broadcast signalling. A transform precoding parameter may be transmitted to the terminal device in a cell-specific signaling configured per BWP (Bandwidth part). A transform precoding parameter may reuse other transform precoding parameter for other message(s) which may be configured to the terminal device in a dedicated signalling or a broadcast signalling or a cell-specific signaling configured per BWP.

In an embodiment, the at least one transform precoding parameter may comprise one or more of at least one transform precoding parameter for the PUSCH in the CFRA; at least one transform precoding parameter for the PUSCH in a two-step contention-based random access, CBRA; at least one transform precoding parameter for the PUSCH in a four-step random access; a transform precoding parameter for the PUSCH scheduled by downlink control information, DCI; and at least one transform precoding parameter for the PUSCH with a configured grant.

In an embodiment, the at least one transform precoding parameter for the PUSCH in the CFRA may be provided in a dedicated signalling. For example, the at least one transform precoding parameter for the PUSCH in the CFRA may be transmitted to the terminal device in the dedicated signalling. The dedicated signalling may be any suitable dedicated signalling such as RACH-ConfigDedicated information element (IE) in a radio resource control (RRC) message as described in 3GPP TS36.331 V15.8.0.

In an embodiment, the at least one transform precoding parameter for msgA PUSCH may be provided in the dedicated signaling for two-step CFRA procedure.

In an embodiment, the dedicated signalling for preamble and the dedicated signalling for the waveform/transform precoding configuration for the PUSCH in the CFRA may be in a RRC message such as the same IE, e.g. RACH-ConfigDedicated IE in one RRC message.

In an embodiment, a field of the at least one transform precoding parameter for the PUSCH in the CFRA is provided in the dedicated signalling. As an example, as shown in Table 1, 1 bit field "msgA-transformPrecodeC FRA" provided in RACH-ConfigDedicated IE may be used for waveform) determination for msgA PUSCH transmission in CFRA.

TABLE 1

| msgA-transformPrecodeCFRA | Waveform of msgA PUSCH in CFRA. If the parameter is not configured, msgA PUSCH follows the waveform of msgA PUSCH in CBRA. |
|---|---|

In an embodiment, the dedicated signalling may comprise at least one of a dedicated signalling for random access in a radio resource control, RRC, message; a handover command message; a beam failure recover message; and a physical downlink control channel, PDCCH, ordering the random access with two-step CFRA.

In an embodiment, the dedicated signalling for random access in the RRC may be RACHConfigDedicated information element, IE.

In an embodiment, when the at least one transform precoding parameter for the PUSCH in the CFRA is obtained, the transform precoding on the PUSCH of the request message may be controlled based on the at least one transform precoding parameter for the PUSCH in the CFRA.

In an embodiment, when the at least one transform precoding parameter for the PUSCH in the CFRA is not obtained and when at least one of following transform precoding parameters is obtained, the transform precoding on the PUSCH of the request message may be controlled based on the at least one of the following transform precoding parameters:

at least one transform precoding parameter for the PUSCH in the two-step CBRA;

at least one transform precoding parameter for the PUSCH in the four-step random access;

at least one transform precoding parameter for the PUSCH scheduled by DCI; and;

at least one transform precoding parameter for the PUSCH with the configured grant.

As a first example, if the at least one transform precoding parameter for the PUSCH in the two-step CBRA is obtained and other transform precoding parameters are not obtained, the UE may, for the PUSCH transmission of CFRA, consider the transform precoding either enabled or disabled according to the at least one transform precoding parameter for the PUSCH in the two-step CBRA.

As a second example, if the at least one transform precoding parameter for the PUSCH in the four-step random access is obtained and other transform precoding parameters are not obtained, the UE may, for the PUSCH transmission of CFRA, consider the transform precoding either enabled or disabled according to the at least one transform precoding parameter for the PUSCH in the four-step random access.

As a third example, if the at least one transform precoding parameter for the PUSCH scheduled by DCI is obtained and other transform precoding parameters are not obtained, the UE may, for the PUSCH transmission of CFRA, consider the transform precoding either enabled or disabled according to the at least one transform precoding parameter for the PUSCH scheduled by DCI.

As a fourth example, if the at least one transform precoding parameter for the PUSCH with the configured grant is obtained and other transform precoding parameters are not obtained, the UE may, for the PUSCH transmission of CFRA, consider the transform precoding either enabled or disabled according to the at least one transform precoding parameter for the PUSCH with the configured grant.

In an embodiment, the transform precoding on the PUSCH of the request message may be controlled based on the at least one transform precoding parameter for the PUSCH in the CFRA.

In an embodiment, the transform precoding on the PUSCH of the request message may be controlled based on the at least one transform precoding parameter for the PUSCH in a two-step contention-based CBRA.

In an embodiment, the transform precoding on the PUSCH of the request message may be controlled based on the at least one transform precoding parameter for the PUSCH in a four-step random access.

In an embodiment, the transform precoding on the PUSCH of the request message may be controlled based on the at least one transform precoding parameter for the PUSCH scheduled by DCI.

In an embodiment, the transform precoding on the PUSCH of the request message may be controlled based on the at least one transform precoding parameter for the PUSCH with a configured grant.

At block 304, the terminal device may transmit, to a network node, the request message for the CFRA.

At block 306 (optionally), when the CFRA is a two-step CFRA, the terminal device may receive, from the network node, a response indicating whether the CFRA is successful. The response may be MsgB of two-step CFRA.

FIG. 4 shows a flowchart of a method according to another embodiment of the present disclosure, which may be performed by an apparatus implemented in/as a terminal device or communicatively coupled to the terminal device. As such, the apparatus may provide means for accomplishing various parts of the method 400 as well as means for accomplishing other processes in conjunction with other components. For some parts which have been described in the above embodiments, detailed description thereof is omitted here for brevity. In this embodiment, the network node is a handover target network node.

At block 402, the terminal device may receive the dedicated signalling from a handover source network node. The at least one transform precoding parameter for the PUSCH in the CFRA may be sent by the handover target network node to the handover source network node.

At block 404, the terminal device may obtain at least one transform precoding parameter to be used for a request message for a CFRA. The request message may comprises a RACH preamble and a PUSCH. A transform precoding on the PUSCH of the request message may be controlled based on the at least one transform precoding parameter. Block 404 is similar to block 302 of FIG. 3.

At block 406, the terminal device may transmit, to the handover target network node, the request message for the CFRA. Block 406 is similar to block 304 of FIG. 3.

At block 408, when the CFRA is a two-step CFRA, the terminal device may receive, from the handover target network node, a response indicating whether the CFRA is successful. Block 408 is similar to block 306 of FIG. 3.

FIG. 5 shows a flowchart of a method according to another embodiment of the present disclosure, which may be performed by an apparatus implemented in/as a network node or communicatively coupled to the network node. As such, the apparatus may provide means for accomplishing various parts of the method 500 as well as means for accomplishing other processes in conjunction with other components. For some parts which have been described in the above embodiments, detailed description thereof is omitted here for brevity.

At block 502, the network node may transmit at least one transform precoding parameter to a terminal device. The at least one transform precoding parameter may be transmitted to the terminal device in various messages such as dedicated signalling, broadcast signalling, etc. The network node may transmit at least one transform precoding parameter to the terminal device directly or via another network node.

In an embodiment, the network node is a handover target network node, the network node may transmit the at least one transform precoding parameter for the PUSCH in the CFRA to a handover source network node which transmits the at least one transform precoding parameter for the PUSCH in the CFRA in the dedicated signalling to the terminal device.

At block 504, the network node may receive, from the terminal device, a request message for a CFRA. For example, the terminal device may transmit the request message at block 304 of FIG. 3, and then the network node may receive this request message. The request message may comprises a RACH preamble and a PUSCH. A transform precoding on the PUSCH of the request message may be controlled based on the at least one transform precoding parameter.

At block 506 (optionally), when the CFRA is a two-step CFRA, the network node may transmit, to the terminal device, a response indicating whether the CFRA is successful. The response may be MsgB of two-step CFRA.

In an embodiment, the at least one transform precoding parameter of msgA PUSCH for CFRA may use one or more of the following:

The at least one transform precoding parameter of msgA PUSCH for CBRA (this may be configured per BWP (Bandwidth part)). For example, the higher layer configured parameter msgA-transformPrecoder (for CBRA) may be reused.

The at least one transform precoding parameter of msg3 PUSCH. For example, the higher layer configured parameter msg3-transformPrecoder may be reused.

The at least one transform precoding parameter provided for the normal PUSCH (such as non-random access PUSCH) transmission in the PUSCH configuration (such as PUSCH-config) IE (Information Element)

The at least one transform precoding parameter of PUSCH with a configured grant. For example, the transformPrecoder in the configuredGrantConfig may be reused.

Figure 6:
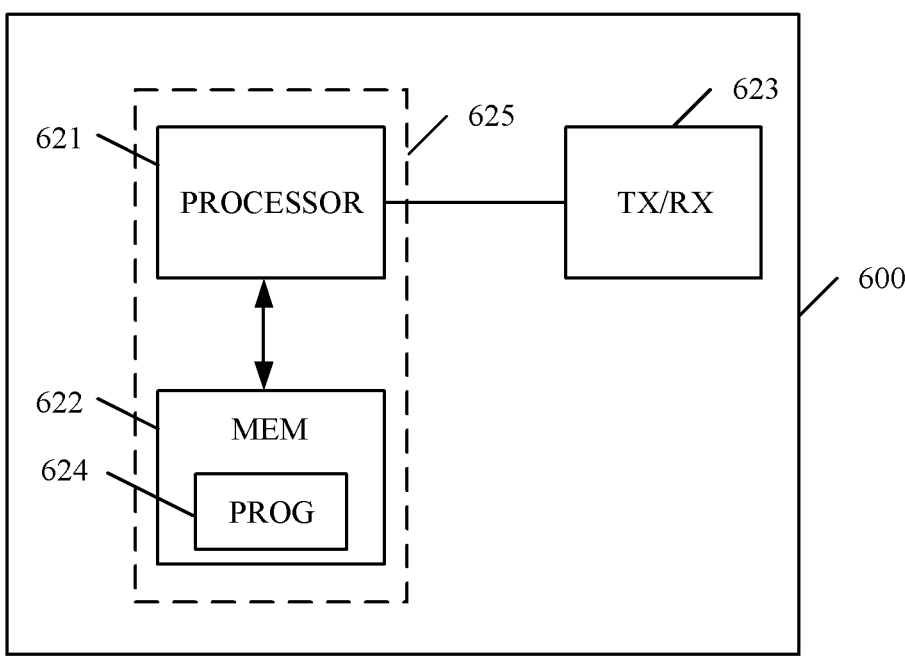
FIG. 6 is a block diagram showing an apparatus suitable for practicing some embodiments of the disclosure.

FIG. 6 is a block diagram showing an apparatus suitable for practicing some embodiments of the disclosure. For example, any one of the network node and the terminal device described above may be implemented as or through the apparatus 600.

The apparatus 600 comprises at least one processor 621, such as a DP, and at least one MEM 622 coupled to the processor 621. The apparatus 620 may further comprise a transmitter TX and receiver RX 623 coupled to the processor 621. The MEM 622 stores a PROG 624. The PROG 624 may include instructions that, when executed on the associated processor 621, enable the apparatus 620 to operate in accordance with the embodiments of the present disclosure. A combination of the at least one processor 621 and the at least one MEM 622 may form processing means 625 adapted to implement various embodiments of the present disclosure.

Various embodiments of the present disclosure may be implemented by computer program executable by one or more of the processor 621, software, firmware, hardware or in a combination thereof.

The MEM 622 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 621 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the terminal device, the memory 622 contains instructions executable by the processor 621, whereby the terminal device operates according to any of the methods 300 and 400 as described in reference to FIGS. 3-4.

In an embodiment where the apparatus is implemented as or at the network node, the memory 622 contains instructions executable by the processor 621, whereby the network node operates according to the method 500 as described in reference to FIG. 5.

Figure 7:
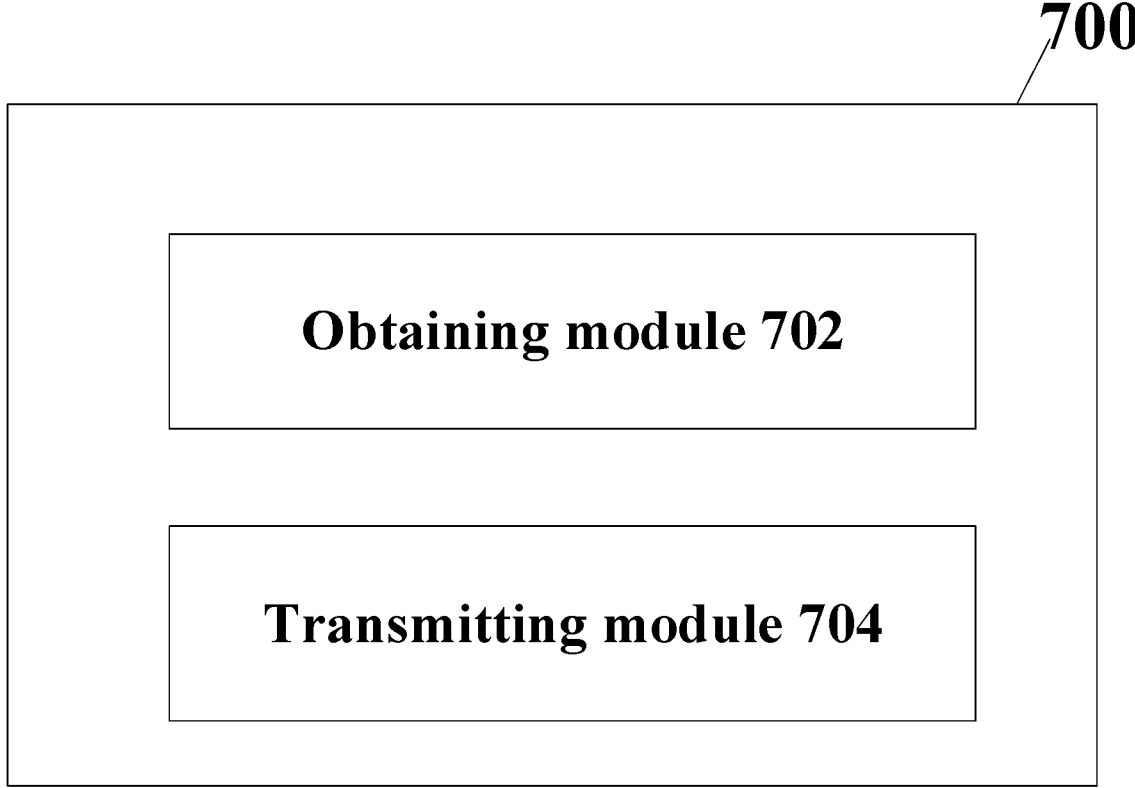
FIG. 7 is a block diagram showing a terminal device according to an embodiment of the disclosure.

FIG. 7 is a block diagram showing a terminal device according to an embodiment of the disclosure. As shown, the terminal device 700 comprises an obtaining module 702 and a transmitting module 704. The obtaining module 702 may be configured to obtain at least one transform precoding parameter to be used for a request message for a contention free random access, CFRA. The transmitting module 704 may be configured to transmit, to a network node, the request message for the CFRA. The request message may comprise a random access channel, RACH, preamble and a physical uplink shared channel, PUSCH. A transform precoding on the PUSCH of the request message may be controlled based on the at least one transform precoding parameter.

Figure 8:
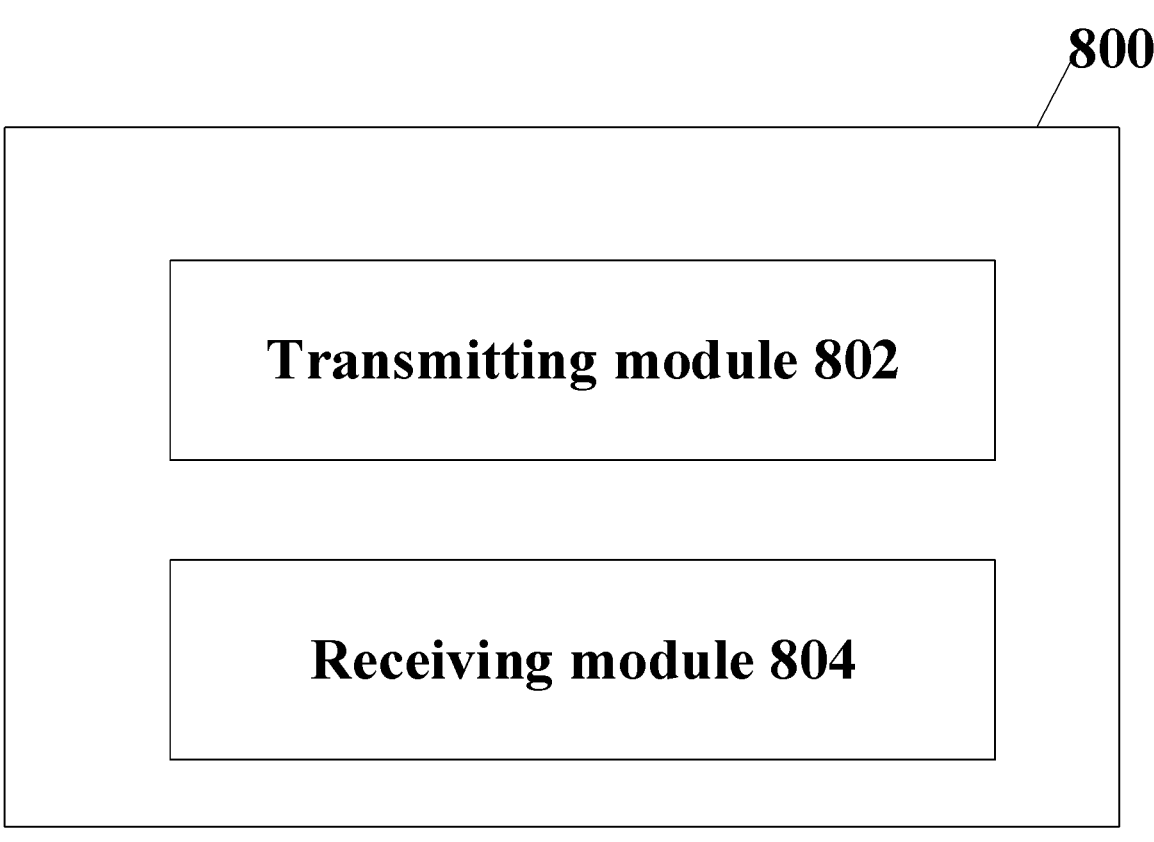
FIG. 8 is a block diagram showing a network node according to an embodiment of the disclosure.

FIG. 8 is a block diagram showing a network node according to an embodiment of the disclosure. As shown, the network node 800 comprises a transmitting module 802 and a receiving module 804. The transmitting module 802 may be configured to transmit at least one transform precoding parameter to a terminal device. The receiving module 804 may be configured to receive, from the terminal device, a request message for a contention free random access, CFRA. The request message may comprise a random access channel, RACH, preamble and a physical uplink shared channel, PUSCH. A transform precoding on the PUSCH of the request message may be controlled based on the at least one transform precoding parameter.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such those that are described herein.

With function units, the terminal device or network node may not need a fixed processor or memory, any computing resource and storage resource may be arranged from the network node or terminal device in the communication system. The introduction of virtualization technology and network computing technology may improve the usage efficiency of the network resources and the flexibility of the network.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
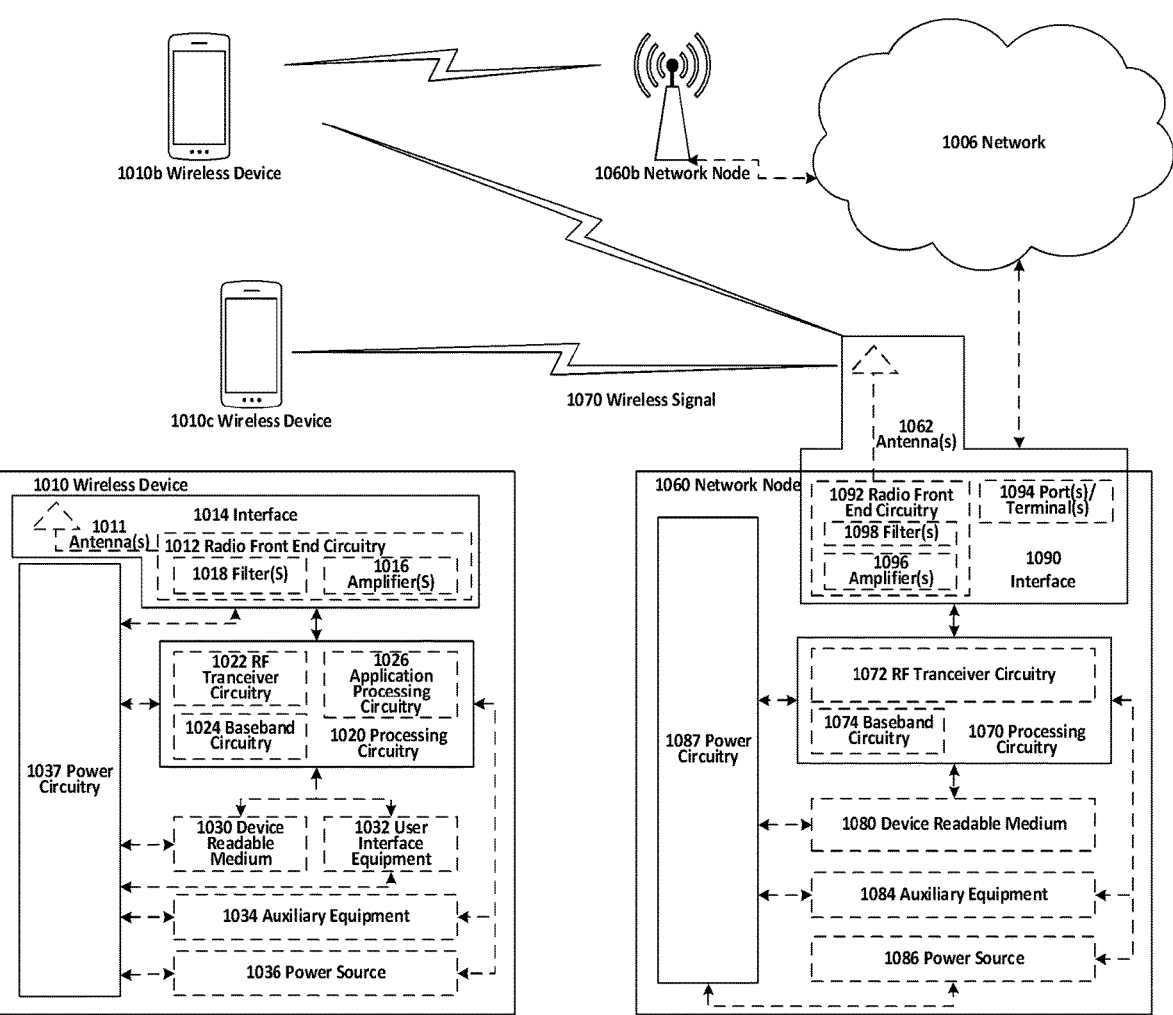
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
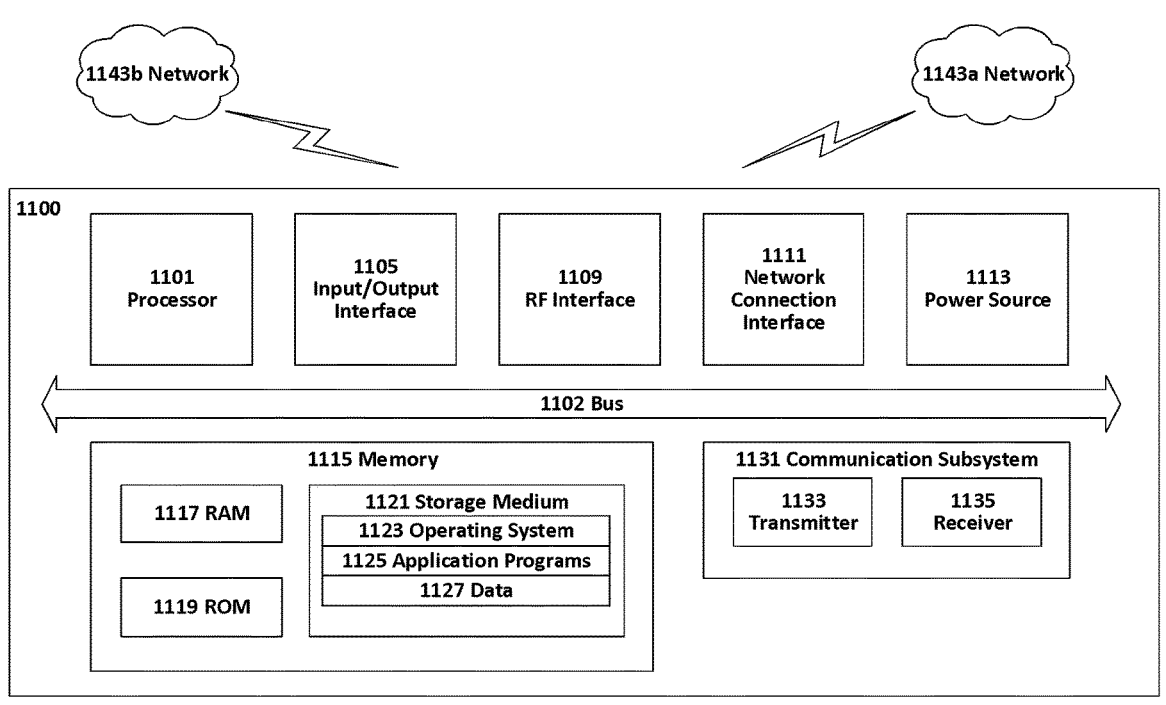
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
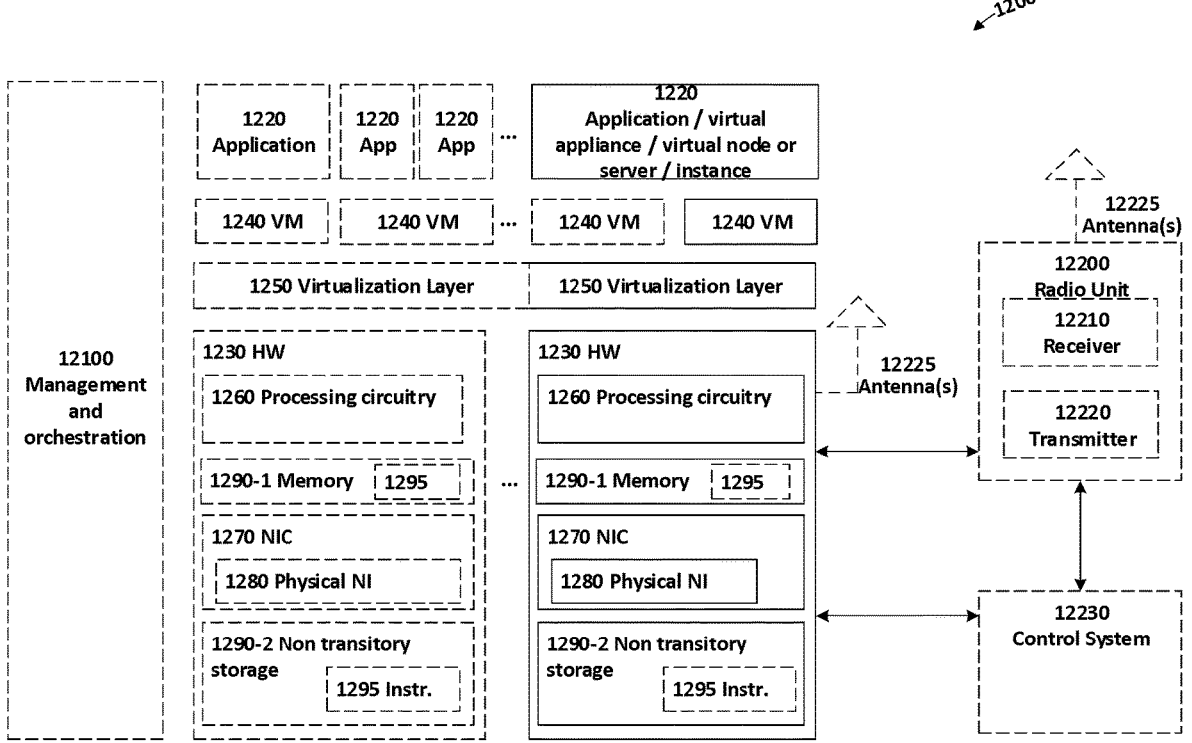
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
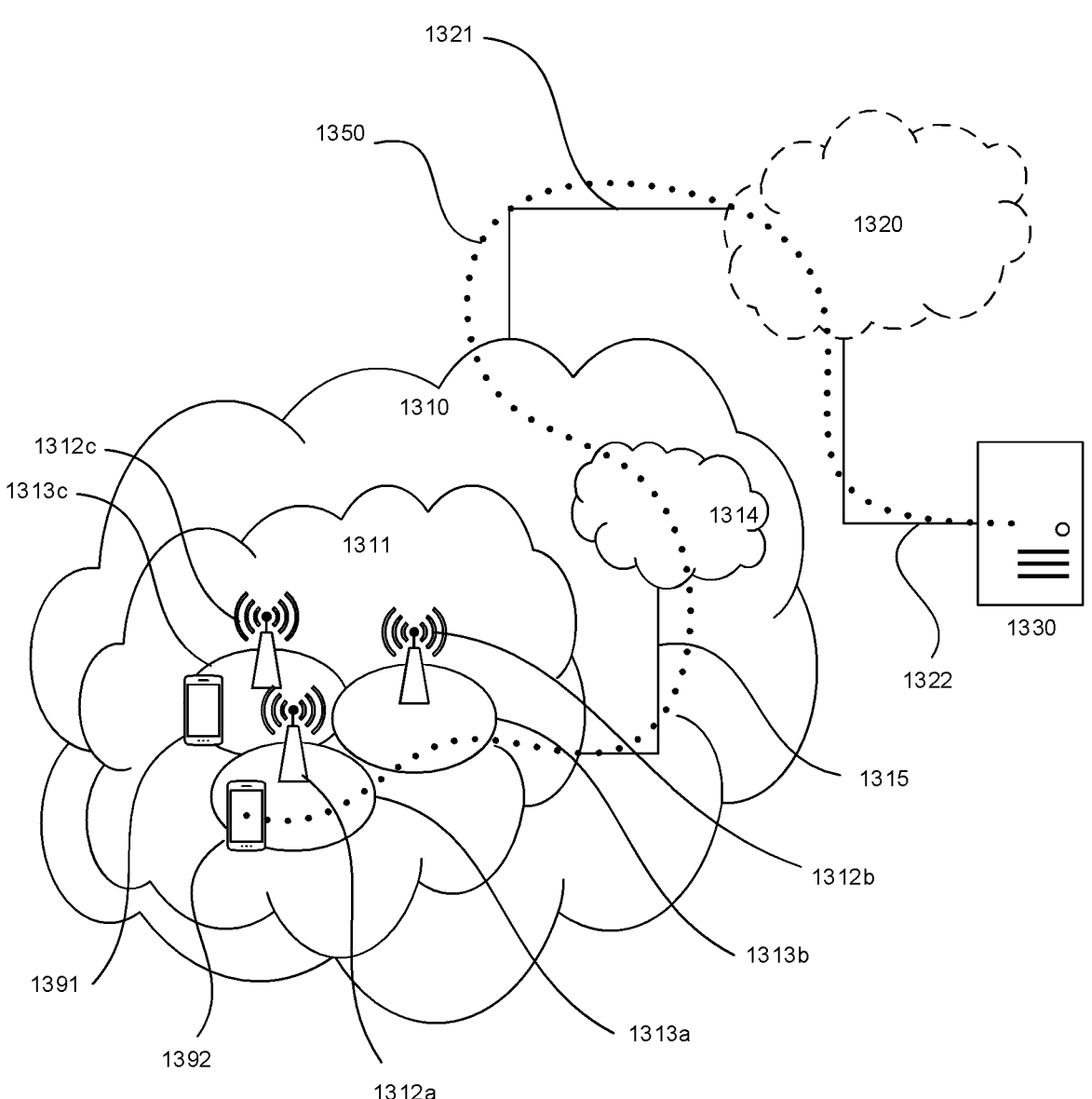
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
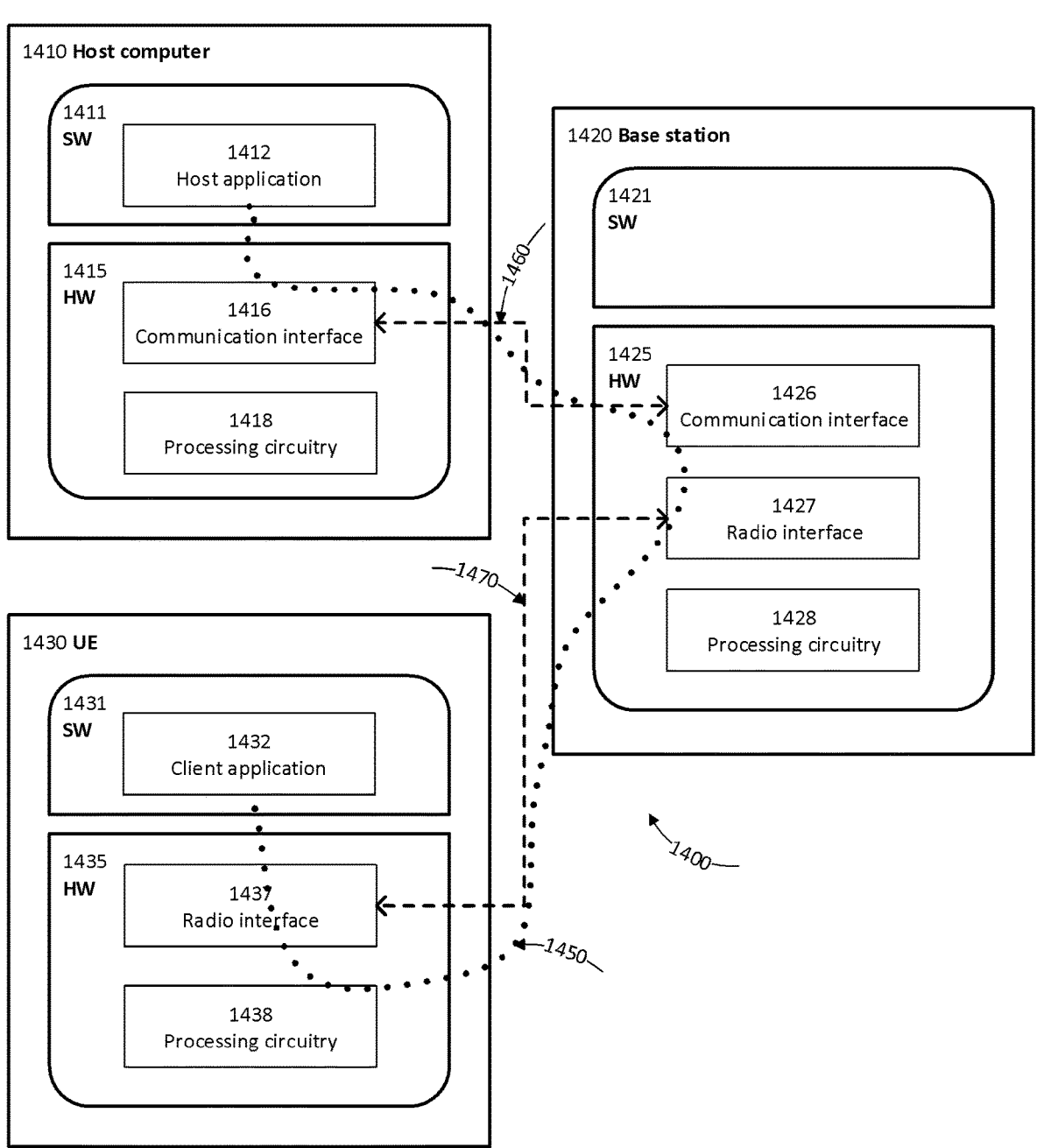
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
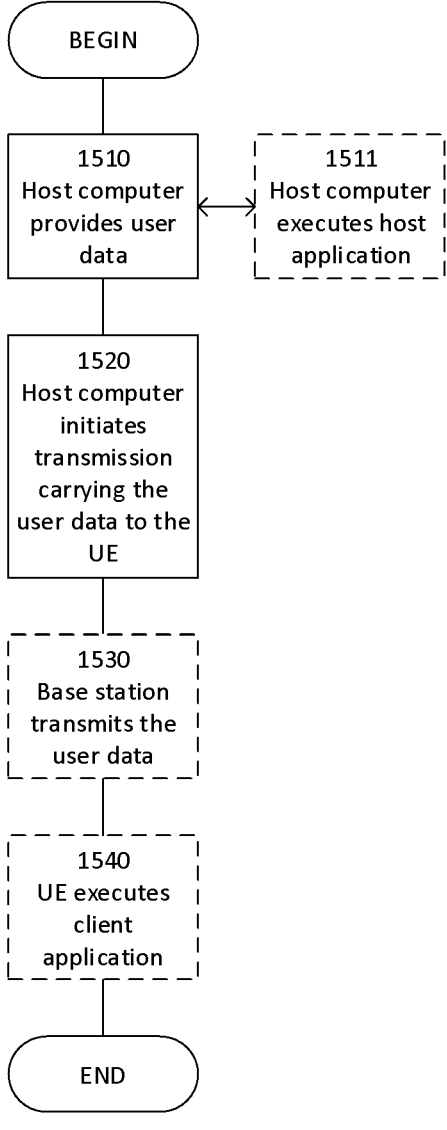
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
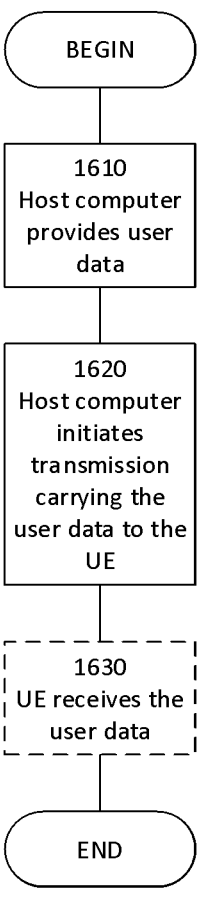
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
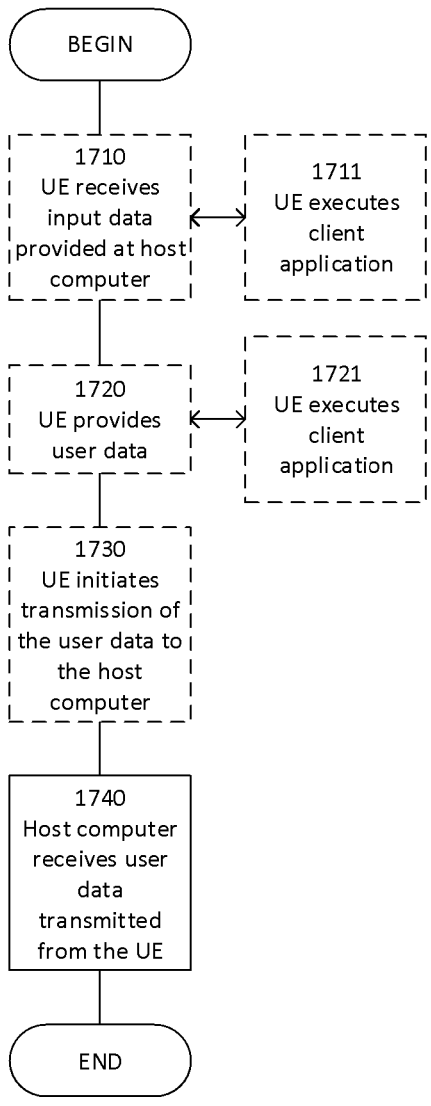
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
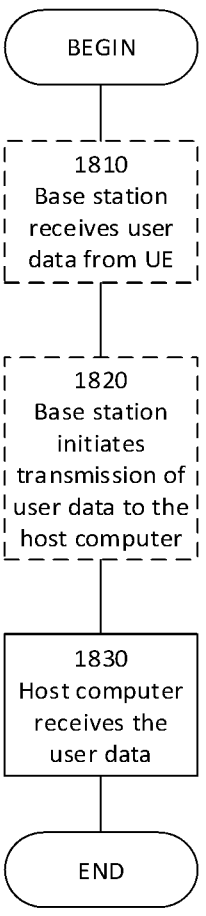
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Embodiments herein afford many advantages, of which a non-exhaustive list of examples follows. In some embodiments herein, methods on the msgA PUSCH waveform configuration or transform precoding configuration in CFRA are proposed. In some embodiments herein, the proposed methods can consider both the flexible signaling dynamically provided in the dedicated message and the signaling overhead via reusing some of the existing parameters instead. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a terminal device, the method comprising:

obtaining at least one transform precoding parameter to be used for a request message for a contention free random access (CFRA), wherein the at least one transform precoding parameter comprises a transform precoding parameter for a physical uplink shared channel (PUSCH) in a four-step random access; and transmitting, to a network node, the request message for the CFRA in a two-step random access, wherein the request message comprises a random access channel (RACH) preamble and the PUSCH in the two-step random access, and wherein a transform precoding on the PUSCH of the request message is controlled based on the at least one transform precoding parameter for the PUSCH in the four-step random access.

2. The method according to claim 1, wherein the transform precoding on the PUSCH of the request message is controlled based on the at least one transform precoding parameter for the PUSCH scheduled by downlink control information (DCI).

3. The method according to claim 1, wherein the transform precoding on the PUSCH of the request message is controlled based on the at least one transform precoding parameter for the PUSCH with a configured grant.

4. The method according to claim 1, wherein at least one transform precoding parameter for the PUSCH in the CFRA is provided in a dedicated signalling.

5. The method according to claim 4, wherein the dedicated signalling comprises at least one of:

a dedicated signalling for random access in a radio resource control (RRC) message;

a handover command message;

a beam failure recover message; and a physical downlink control channel (PDCCH) ordering the random access with two-step CFRA.

6. The method according to claim 5, wherein the dedicated signalling for random access in the RRC message is RACHConfigDedicated information element (IE).

7. The method according to claim 4, wherein the network node is a handover target network node, the method further comprises:

receiving the dedicated signalling from a handover source network node, wherein the at least one transform precoding parameter for the PUSCH in the CFRA is sent by the handover target network node to the handover source network node.

8. The method according to claim 1 further comprising receiving, from the network node, a response indicating whether the CFRA is successful.

9. A method implemented at a network node, the method comprising:

transmitting at least one transform precoding parameter to a terminal device, wherein the at least one transform precoding parameter comprises a transform precoding parameter for a physical uplink shared channel (PUSCH) in a four-step random access; and receiving, from the terminal device, a request message for a contention free random access (CFRA) in a two-step random access, wherein the request message comprises a random access channel (RACH) preamble and the PUSCH in the two-step random access, and wherein a transform precoding on the PUSCH of the request message is controlled based on the at least one transform precoding parameter for the PUSCH in the four-step random access.

10. The method according to claim 9, wherein the network node is a handover target network node, said transmitting at least one transform precoding parameter to the terminal device comprises:

transmitting the at least one transform precoding parameter for the PUSCH in the CFRA to a handover source network node which transmits the at least one transform precoding parameter for the PUSCH in the CFRA in a dedicated signalling to the terminal device.

11. The method according to claim 9 further comprising transmitting, to the terminal device, a response indicating whether the CFRA is successful.

12. A terminal device, comprising:

a processor; and a memory, the memory containing instructions which, when executed by the processor, cause the terminal device to:

obtain at least one transform precoding parameter to be used for a request message for a contention free random access (CFRA), wherein the at least one transform precoding parameter comprises a transform precoding parameter for a physical uplink shared channel (PUSCH) in a four-step random access; and transmit, to a network node, the request message for the CFRA in a two-step random access, wherein the request message comprises a random access channel (RACH) preamble and a physical uplink shared channel (PUSCH) the PUSCH in the two-step random access, and wherein a transform precoding on the PUSCH of the request message is controlled based on the at least one transform precoding parameter for the PUSCH in the four-step random access.

* * * * *